Figure 1:
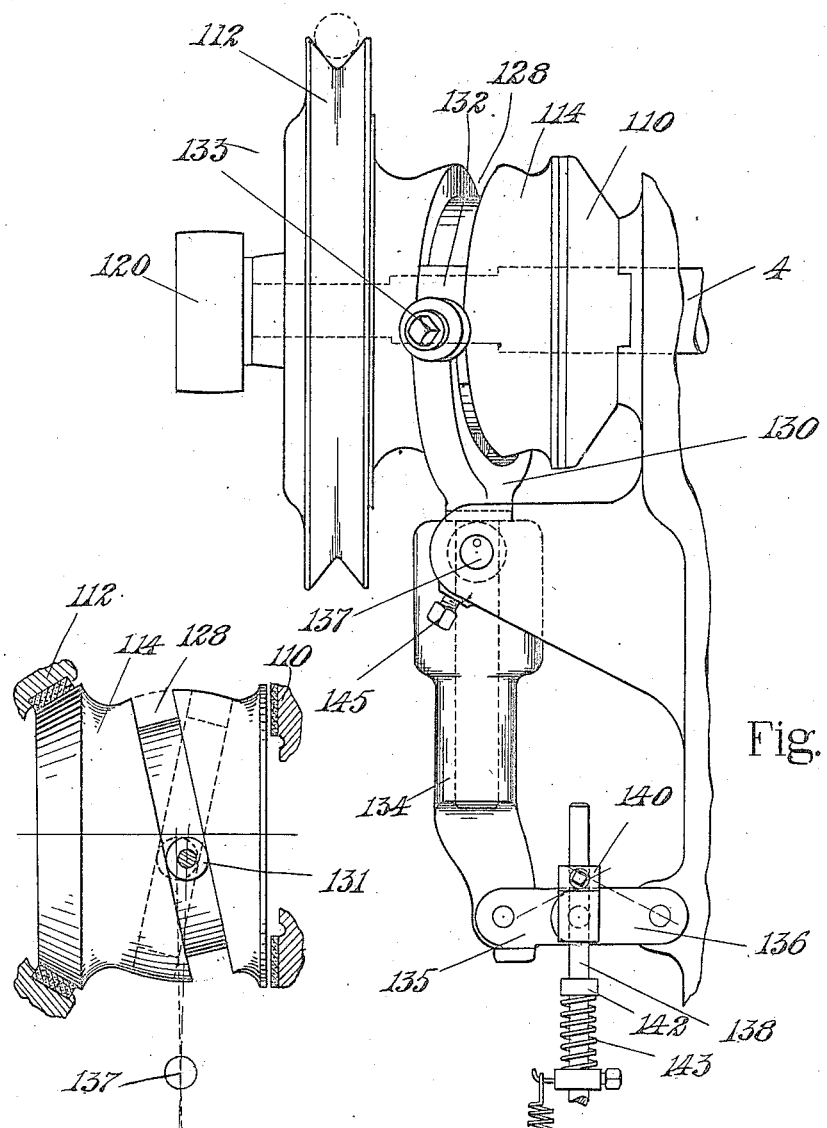

UNITED STATES PATENT OFFICE.

ARTHUR E. JERRAM, OF LEICESTER, ENGLAND, ASSIGNOR TO UNITED SHOE MACHINERY COMPANY, OF PATERSON, NEW JERSEY, A CORPORATION OF NEW JERSEY.

STARTING AND STOPPING MECHANISM.

1,124,620.

Specification of Letters Patent.

Patented Jan. 12, 1915.

Application filed January 2, 1908. Serial No. 408,941.

*To all whom it may concern:*

Be it known that I, ARTHUR E. JERRAM, a subject of the King of England, residing at Leicester, in the county of Leicester, England, have invented certain Improvements in Starting and Stopping Mechanisms, of which the following description, in connection with the accompanying drawings, is a specification, like reference characters on the drawings indicating like parts in the several figures.

This invention relates to improvements in clutches of that type in which a clutch member is arranged to turn with a shaft on which it is mounted and also to be moved longitudinally of said shaft into engagement with a driving pulley for transmitting the motion of said pulley to said shaft.

Clutches of this character are frequently used in cases where it is desired to have the shaft stop always in the same position in its revolution so that parts which are operated from cams or eccentrics mounted on said shaft may stop at a definite point in their various cycles of movement. To this end, it is common in clutches of the above class to provide a brake member fixed in position, with which the clutch member engages when it is moved out of contact with the driving pulley and which serves to stop the rotation of the shaft on which the clutch member is mounted instantly when the clutch member is brought in contact therewith; and also to provide a cam mounted on the main shaft, and acting to throw the clutch member out of contact with the pulley and into engagement with the brake member only at a certain point in the revolution of said shaft.

One feature of this invention is the provision of means for avoiding the necessity of providing a separate cam on the shaft of the machine to perform the operation above stated. Preferably a part of the clutch member itself may be utilized as the cam, thus greatly simplifying the construction of the starting and stopping mechanism and removing one source of possible weakness by rendering it unnecessary to provide separate connections between the clutch member and cam.

Another feature of the invention is the use, in a device such as above described, of novel means acting to render the cam formed on the clutch member ineffective to move said clutch member except as desired. This action is especially advantageous in cases where it is convenient to have the main shaft make more than one rotation before stopping.

Still another feature of this invention relates to the provision of simple and easily accessible means for varying the point in the rotation of the shaft at which the clutch pulley is moved out of engagement with the driving pulley, thus bringing the said shaft to rest. Preferably this means will be so arranged as to permit adjustment without disturbance or derangement of the other parts of the mechanism.

Other features of the invention are the provision of a starting and stopping mechanism which is distinguished by ease and convenience in assembling the same and in which the entire mechanism is supported on a single shaft of the machine in such a manner that it is possible to remove or adjust the pulley without interfering with the other parts of the mechanism.

The above and other objects as will hereinafter appear are obtained in the preferred construction hereinafter described, by providing the clutch member with a cam surface or groove obliquely disposed to its axis of rotation, which cam surface or groove is engaged directly or indirectly at separate points on a line located at one side of said axis by the two arms of a fork or equivalent device, the construction being such that rotation of the clutch member imparts to the arms a movement of oscillation about a point located between them as well as a movement of translation together longitudinally of said axis. The fork is journaled in a socket to permit its arms to oscillate as above described and the socket is movably supported so as to permit the arms of the fork to have the movement of translation together. So long as the arms are permitted to have such movement of translation they will not act to move the clutch member which is then maintained in contact with the driving pulley by suitable springs, but if the arms of the fork are prevented from moving together longitudinally of the axis of rotation of the clutch member the action of said cam surface thereon will cause the clutch member to be forced away from the driving pulley. Accordingly suitable means are provided which are under the control of the operator whereby he can prevent such movement of translation of the arms of the fork and thereby cause the machine to be stopped, or by permitting the arms to have such movement he may allow the springs to move the clutch member into contact with the driving pulley to start the machine.

Other features of the invention will be apparent from the following description of a preferred embodiment thereof selected for purposes of illustration and shown in the accompanying drawings, in which,—

Figure 2:
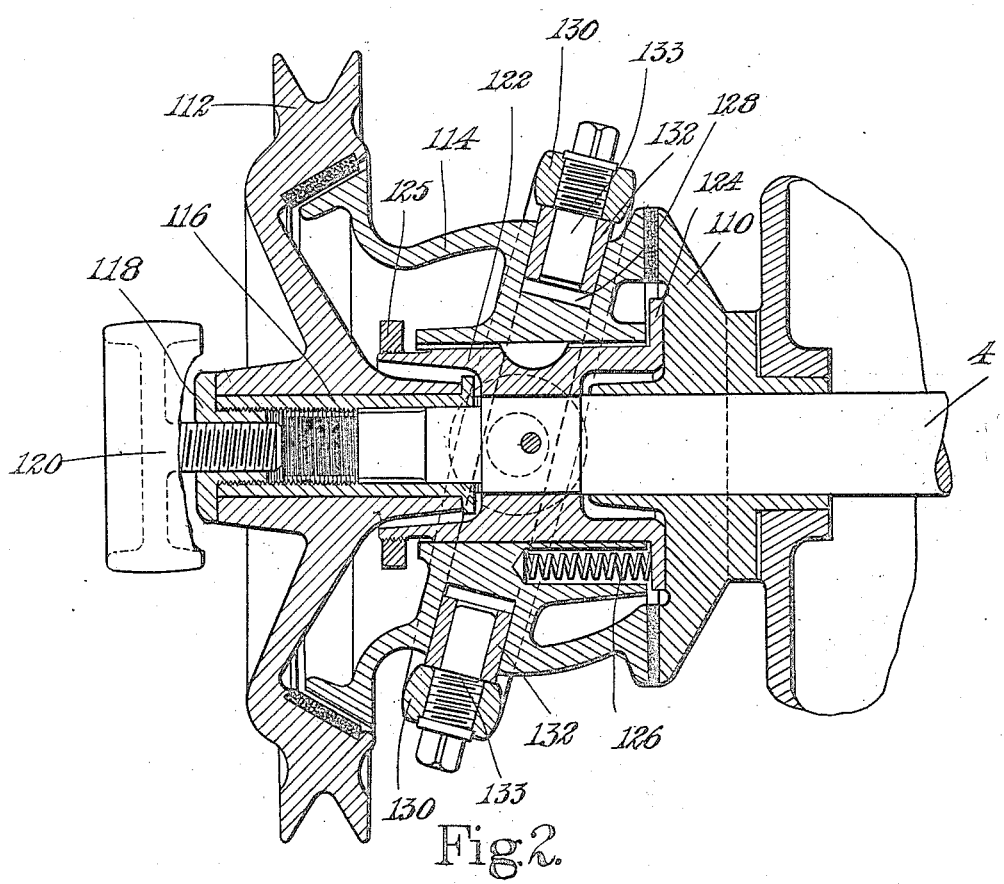

Figure 1 is a side elevation of a starting and stopping mechanism embodying this invention and showing the actuating connection therefor; Fig. 2 is a central horizontal section; and Fig. 3 is a detail showing the clutch member in elevation and a part of the pulley and brake member in section.

The starting and stopping mechanism comprises a driving pulley 112 mounted to turn loosely on an axis coinciding with that of main shaft 4, and preferably adjustable relatively to said main shaft as by being mounted on a flanged bushing 116 screwed upon a reduced screw threaded portion of said shaft. Said pulley may be retained in position on said bushing by a flanged sleeve 118 screwed into said bushing, a lock nut 120 screwing into said sleeve 118 and bearing against the end of shaft 4, serving to retain the parts in adjusted position.

A brake member 110 is mounted upon the frame of the machine and the clutch member 114 is mounted upon shaft 4 between said brake member and pulley so as to be movable into engagement with one or the other of said elements, a facing of leather or fiber being preferably applied to the engaging surfaces of some or all of said elements to increase the efficiency of such engagement. Clutch member 114 is shown as splined upon a sleeve 122 which is fixed on the main shaft and has flanges 124, 125, one or both of which may be adjusted relatively to said sleeve and longitudinally of shaft 4 to vary the limits of movement of said clutch member in either direction.

To secure a compact construction the sleeve 122 may be recessed at each end to permit the hubs of the driving pulley 112 and of the brake member 110 to extend thereunder. One or more springs 126 mounted between clutch member 114 and flange 124 on sleeve 122 tend to move said clutch member to its limit of movement in contact with the other flange 125 and the arrangement will preferably be such that said springs will tend to force the clutch member into contact with the pulley to actuate the shaft 4.

To move the clutch member 114 in the opposite direction against the tension of springs 126, a forked lever 130 is pivotally connected therewith as by means of a cam groove 128 formed in said clutch member on a plane which is inclined with relation to the axis of the main shaft, and ring segments 132 (Figs. 1 and 2) or cam rollers 131 (Fig. 3) engaging said cam groove 128 and mounted on the forked portion of said lever 130 by means of studs 133 screwed into the ends of said lever and provided with plane portions extending into holes formed in said segments. The axis of the said pivotal connection between the forked lever 130 and the clutch member 114 is so disposed that it does not intersect the axis of main shaft 4 but is situated a little below or to one side thereof. The shank of the forked lever 130 is rounded and is journaled in a pendent lever 134 pivoted at 137, as, for example, to an extension from the frame of the machine. The above construction and arrangement is such that during the rotation of the clutch member 114 the forked lever 130 will be oscillated about the axis of its shank by coaction between the walls of cam groove 128 and the ring segments 132 carried by the forks of said lever. Moreover, as the axis of the pivotal connection between the forked lever and clutch mechanism does not intersect the axis of the main shaft the firstnamed axis will have a motion of translation longitudinally of the main shaft in addition to its oscillating movement and this motion of translation will cause forked lever 130 and pendent lever 134 to vibrate about pivot 137 as a center. This action is seen quite clearly in Fig. 3 in which the two extreme positions of cam groove 128 and the cam rollers 131 are shown in full and dotted lines.

So long as the lever 134 is permitted to vibrate as above indicated, the clutch member 114 will be held in engagement with pulley 112 by the action of springs 126, but if the lever 134 is prevented from vibrating the forked lever 130 will move said clutch member 114 lengthwise of the shaft 4 until it is disengaged from driving pulley 112 and forced into contact with brake member 110, thus stopping the machine. A preferred means for stopping the vibration of lever 134 is illustrated in Fig. 1 and comprises a pair of links 135 and 136 pivoted to lever 134 and some fixed point, such as the frame of the machine respectively and connected together to form a toggle. A rod 138 extending from a treadle or the like is provided with a fixed collar 140 for straightening the toggle and a movable collar 142 for breaking the toggle, a spring 143 being provided between said collar 142 and a third collar fixed on rod 138 for taking up the motion of said toggle due to the vibrations of lever 134 when the toggle is broken. Rod 138 is normally held in a position to straighten the toggle and stop the oscillations of lever 134 as by a spring 144.

In operation the parts being in the position indicated in Fig. 2 with the clutch member 114 in contact with brake member 110 and the shaft 4 at rest, the operator depresses the treadle, thereby elevating rod 138 and bringing collar 142 into contact with the pivotal point of connection with links 135 and 136 to break the toggle. This releases lever 134 and permits springs 126 to vibrate said lever on its pivot 137 and to force clutch member 114 into contact with the actuating pulley 112. This starts the rotation of shaft 4 and thereafter so long as the treadle is held down said shaft will be rotated and forked lever 130 will be oscillated about the axis of its shank which is journaled in pendent lever 134 and at the same time said lever 134 will be given a movement longitudinally of shaft 4 due to the movement longitudinally of said shaft of the line connecting the pivotal points of connection of lever 130 and clutch member 114. As will be readily understood, the oscillation of lever 130 about the axis of its shank is an idle movement and without effect on the position of the clutch member, and the vibration of lever 134 on its pivot 137 is also without effect on the position of said clutch member so long as it is permitted to take place. When, however, the toggle is straightened and lever 134 is held against vibration, clutch member 114, as it rotates, is caused by the inclination of groove 128 to move out of contact with pulley 112 and into contact with brake 110, thereby stopping its own rotation and the rotation of shaft 4 at the desired point in such rotation. For purpose of adjustment as to vary the point in the cycle of operations at which the machine is stopped, the pivot of lever 134 is formed eccentrically upon its supporting stud 137 so that by rotatably adjusting the stud in its bearings the position of the pivot can be shifted thus varying the point in the rotation of the shaft, at which the clutch member is moved out of contact with the pulley. The stud can be secured in adjusted position by a bolt 145. In taking this mechanism apart for purposes of inspection or repairs, lock nut 120 will first be loosened when said nut and sleeve 118 may be removed together. This releases pulley 112 which can now be removed without interfering or deranging the other parts of the clutch. If it should be desired to remove the clutch member also the flanged bushing 116 and flange 125 would next be removed and studs 133 would be removed from the ends of the forked arms of pivot 130, thereby releasing the ring segments 132 after which the clutch member 114 can be slid off of its sleeve 122.

While the starting and stopping mechanism has been shown and described as provided with a brake mechanism, it is plain that the brake member can be omitted without interfering with the use of the means herein disclosed for moving said clutch member into and out of engagement with the pulley. It is also plain that other means may be substituted for those herein shown for stopping the vibration of the pivoted pendent lever 134, that it is not essential that pulley 112 be supported on an extension of shaft 4 itself so long as its axis coincides with the axis of said shaft, and that other changes can be made in the device disclosed coming within the scope of the following claims.

Having described my invention, what I claim as new and desire to secure by Letters Patent of the United States is:—

1. In a machine of the class described, the combination with a shaft, of a driving pulley therefor, a clutch member separate from the pulley for connecting said shaft and pulley, and means for breaking such connection for stopping the shaft comprising a continuous obliquely disposed cam surface formed on the clutch member itself and a device for engaging said cam surface at separated points, all substantially as described.

2. In a mechanism of the class described, the combination with a shaft, of an actuating pulley therefor, a clutch member movable longitudinally of the shaft into engagement with said pulley, and means for moving said clutch member out of engagement with the pulley comprising a cam groove formed in said clutch member, a forked lever in engagement with said groove, and means for controlling the movement of the lever.

3. In a mechanism of the class described, the combination with a shaft and a driving pulley therefor, of a clutch for connecting said pulley and shaft to transmit motion from one to the other, and means acting on said clutch mechanism to break such connection between said shaft and pulley comprising a member having a plurality of distinct movements as the shaft is driven by the pulley and means for interrupting certain of said movements.

4. In a mechanism of the class described, the combination with a shaft and a driving pulley therefor, of a clutch member for connecting said pulley and shaft to transmit motion from one to the other, and means acting on said clutch member to break such connection between the shaft and pulley comprising a member actuated by said clutch member and having a movement longitudinally of said clutch member and means for interrupting such movement.

5. In a mechanism of the class described, the combination with a shaft and a driving pulley therefor, of a clutch mechanism for connecting said pulley and shaft to transmit motion from one to the other, and means acting on said clutch mechanism to break such connection between the pulley and shaft comprising a member having a movement longitudinally of said shaft and another movement at an angle to the direction of the first movement and means for interrupting one of said movements.

6. In a mechanism of the class described, the combination with a shaft and a driving pulley therefor, of a clutch mechanism for connecting said pulley and shaft to transmit motion from one to the other, and means acting on said clutch mechanism to break such connection between the pulley and shaft comprising a member having a plurality of movements, one being a vibration in a plane parallel to the axis of said shaft, and means for interrupting one of the movements of said member.

7. In a mechanism of the class described, the combination with a shaft and a driving pulley therefor, of a clutch mechanism for connecting said pulley and shaft to transmit motion from one to the other, and means acting on said clutch mechanism to break such connection between the pulley and shaft comprising a member having a movement of vibration in a plane parallel to the axis of said shaft and another movement of oscillation about a part of itself, and means for stopping one of said movements.

8. In a mechanism of the class described, the combination of a shaft, a driving pulley therefor, a clutch mechanism for connecting said pulley and shaft to transmit motion from one to the other, a brake, and means for moving one clutch member from the driving pulley to the brake to stop said shaft at a definite point in the rotation of said shaft, comprising a cam surface formed on the clutch member itself and a movable device for engaging said cam surface at separated points.

9. In a mechanism of the class described, the combination with a shaft, of an actuating pulley therefor, a clutch member movable longitudinally of said shaft into engagement with said pulley to connect said pulley and shaft for the purpose of transmitting motion from one to the other, and a lever for moving said clutch member out of engagement with said pulley at a predetermined point in the rotation of the shaft, together with means for bodily shifting said lever to vary the point in the rotation of the shaft at which the pulley and shaft are disconnected.

10. In a mechanism of the class described, the combination with a shaft and a driving pulley therefor, of a brake member, a clutch member movable alternately into contact with said actuating pulley and brake member for the purpose of alternately connecting said actuating pulley and shaft to transmit motion from one to the other, and of breaking such connection to stop the shaft, means coöperating with said clutch member whereby the latter acts to move itself out of contact with said pulley at a predetermined point in the rotation of the shaft, and means acting on said last-mentioned means for changing its position relatively to said clutch member to vary the point in the rotation of the shaft at which said last-mentioned means becomes operative.

11. In a mechanism of the class described, the combination with a shaft, of a member adjustable longitudinally of said shaft, an actuating pulley for said shaft journaled on said adjustable member, a clutch member for connecting the pulley to said shaft independently of said adjustable member for setting the shaft in motion, and means for holding said pulley in position on said adjustable member.

12. In a mechanism of the class described, the combination with a shaft, of a pulley mounted on an axis coinciding with the axis of said shaft, means connecting said pulley and shaft to transmit motion from one to the other, a sleeve on which said pulley is mounted, and a flanged bushing threaded into the interior of said sleeve and having a flange serving to retain said pulley in position on said sleeve.

13. In a mechanism of the class described, the combination with a shaft, of a pulley mounted on an axis coinciding with the axis of said shaft, means connecting said pulley and shaft for transmitting motion from one to the other, a sleeve on which said pulley is mounted, and a flanged bushing threaded into the interior of said sleeve having a flange serving to retain said pulley in position on said sleeve, and a locking screw for the flanged portion.

14. In a mechanism of the class described, the combination with a shaft, of an actuating pulley therefor, a clutch member movable into engagement with said pulley for transmitting motion between said pulley and shaft, a member connected to said clutch member and actuated therefrom, and means for preventing movement of the last-mentioned member whereby the clutch is moved away from the pulley.

15. In a mechanism of the class described, the combination of a shaft, an actuating pulley therefor, a clutch member movable longitudinally of its axis of rotation to connect said pulley and shaft for transmitting motion from one to the other, said clutch member having a cam groove or surface obliquely disposed with relation to its axis, a forked lever engaging with its arms said groove or surface at separate points in a line located below or at one side of said axis whereby rotation of the clutch member imparts to the arms a movement of oscillation about a center located between them as well as a movement of translation in common longitudinally of said axis, and means that are adapted to stop the latter movement of said arms for breaking the connection between said pulley and shaft.

16. In a mechanism of the class described, a main shaft, an actuating pulley therefor, a clutch member movable to connect said pulley and shaft for transmitting motion from one to the other, said clutch member having a cam groove or surface obliquely disposed with relation to its axis, a forked lever having its arm engaging said groove or surface at separate points in a line located below or at one side of said axis, a pendent lever pivoted to swing longitudinally of the axis of rotation of said clutch member and having the shank of the said forked lever journaled therein, and a toggle connecting the lever with a fixed part and adapted to prevent this motion of the pendent lever, for breaking the connection between the pulley and shaft.

17. In a mechanism of the class described the combination with a shaft and a driving pulley therefor, of a clutch member for connecting said pulley and shaft to transmit motion from one to the other, a brake for arresting the rotation of said clutch member, and a lever vibrated by said clutch member, said lever and clutch member being so related that when the movement of said lever is interrupted the clutch member shifts itself from the driving pulley to the brake.

In testimony whereof I have signed my name to this specification in the presence of two subscribing witnesses.

ARTHUR E. JERRAM.

Witnesses:
GRACE HOLMES,
JOHN RICHARD LAW.